US009452681B2

United States Patent
Mihara et al.

(10) Patent No.: US 9,452,681 B2
(45) Date of Patent: Sep. 27, 2016

(54) PROPULSION CONTROL DEVICE AND PROPULSION CONTROL METHOD

(71) Applicant: MITSUBISHI ELECTRIC CORPORATION, Chiyoda-ku, Tokyo (JP)

(72) Inventors: Tomonobu Mihara, Tokyo (JP); Yoshio Nagatsuka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/782,620

(22) PCT Filed: Apr. 12, 2013

(86) PCT No.: PCT/JP2013/061063
§ 371 (c)(1),
(2) Date: Oct. 6, 2015

(87) PCT Pub. No.: WO2014/167711
PCT Pub. Date: Oct. 16, 2014

(65) Prior Publication Data
US 2016/0039290 A1 Feb. 11, 2016

(51) Int. Cl.
*B60L 3/04* (2006.01)
*B60L 3/00* (2006.01)
*B60L 9/18* (2006.01)

(52) U.S. Cl.
CPC .................. *B60L 3/04* (2013.01); *B60L 3/003* (2013.01); *B60L 9/18* (2013.01)

(58) Field of Classification Search
CPC .................................. B60L 3/04; G08B 21/00
See application file for complete search history.

(56) References Cited

U.S. PATENT DOCUMENTS

| 6,384,567 | B1 | 5/2002 | Maeda |
| 7,309,929 | B2 * | 12/2007 | Donnelly .................. B60L 7/06 290/4 R |

(Continued)

FOREIGN PATENT DOCUMENTS

| JP | 1-138902 A | 5/1989 |
| JP | 2-26303 U | 2/1990 |

(Continued)

OTHER PUBLICATIONS

International Search Report (PCT/ISA/210) mailed on May 21, 2013, by the Japanese Patent Office as the International Searching Authority for International Application No. PCT/JP2013/061063.

(Continued)

*Primary Examiner* — Thomas Tarcza
*Assistant Examiner* — Alex C Dunn
(74) *Attorney, Agent, or Firm* — Buchanan Ingersoll & Rooney PC

(57) ABSTRACT

An abnormality detector detects whether an abnormality is occurring in a power converter based on electric current that the power converter outputs and an electric current detector detects. When a value that includes the number of power converters in which an abnormality is occurring, and that indicates amount of reduction in propelling force of a vehicle satisfies a judgment criterion, a determiner determines that an increase is required in the output of the power converter in which no abnormality is occurring, among multiple power converters, to a level higher than normal output. An output controller stops the power converter if notified by the abnormality detector of an occurrence of an abnormality in the power converter. The output controller controls the output of the power converter, for which the determiner determines that the increase is required so that the output becomes higher than the normal output.

9 Claims, 11 Drawing Sheets

(56) References Cited

U.S. PATENT DOCUMENTS

| | | | | |
|---|---|---|---|---|
| 7,314,424 | B2* | 1/2008 | Supina | B60K 6/40 |
| | | | | 180/197 |
| 7,507,500 | B2* | 3/2009 | Donnelly | B60L 3/0046 |
| | | | | 429/120 |
| 7,518,254 | B2* | 4/2009 | Donnelly | B60L 7/06 |
| | | | | 290/1 A |
| 7,565,867 | B2* | 7/2009 | Donnelly | B60L 9/22 |
| | | | | 105/26.05 |
| 7,688,218 | B2* | 3/2010 | LeFebvre | B61K 9/00 |
| | | | | 246/169 R |
| 7,894,958 | B2* | 2/2011 | Tate | B60T 8/175 |
| | | | | 180/446 |
| 7,990,114 | B2* | 8/2011 | Ganev | H02P 29/032 |
| | | | | 322/37 |
| 8,188,692 | B2* | 5/2012 | Kumar | B60K 6/46 |
| | | | | 105/26.05 |
| 8,354,813 | B2* | 1/2013 | Hasegawa | H02P 29/0088 |
| | | | | 318/432 |
| 8,688,303 | B2* | 4/2014 | Stevens | B62J 17/08 |
| | | | | 123/179.28 |
| 9,126,599 | B2* | 9/2015 | Ozaki | H02K 7/116 |

FOREIGN PATENT DOCUMENTS

| | | |
|---|---|---|
| JP | 4-334902 A | 11/1992 |
| JP | 5-284609 A | 10/1993 |
| JP | 7-087604 A | 3/1995 |
| JP | 10-336806 A | 12/1998 |
| JP | 11-008906 A | 1/1999 |
| JP | 2001-157487 A | 6/2001 |
| JP | 2002-271902 A | 9/2002 |
| JP | 2005-341784 A | 12/2005 |

OTHER PUBLICATIONS

Written Opinion (PCT/ISA/237) mailed on May 21, 2013, by the Japanese Patent Office as the International Searching Authority for International Application No. PCT/JP2013/061063.

* cited by examiner

# PROPULSION CONTROL DEVICE AND PROPULSION CONTROL METHOD

TECHNICAL FIELD

This disclosure relates to a propulsion control device and propulsion control method for controlling propelling force of a vehicle.

BACKGROUND ART

In an electric railway vehicle (hereafter, referred to as electric vehicle), there is a requirement to continue operation of the electric vehicle even when any of power converters has stopped due to failure or the like. An electric vehicle drive device that is disclosed in Patent Literature 1 performs control so that, when any of the power converters that drive the coils of a driving force generator fails, transition to operation without sudden torque fluctuation is possible by combining the power converters other than the failed power converters.

CITATION LIST

Patent Literature

Patent Literature 1: Unexamined Japanese Patent Application Kokai Publication No. H7-87604

SUMMARY OF INVENTION

Technical Problem

When driving an electric vehicle as in the case of the electric vehicle drive device disclosed in Patent Literature 1 and when any of the power converters stops due to failure or the like so that the remaining power converters are combined, there is a possibility that sufficient propelling force for the electric vehicle cannot be obtained. Therefore, conventionally, in order to obtain the necessary propelling force when an abnormality occurs in any of the power converters, the operator operates a specified device based on the judgment of the operator so that the output of the power converters becomes higher than normal output. However, when the operator makes a mistake in judgment or operation, there is a possibility that sufficient propelling force cannot be obtained.

The present disclosure is made to solve the problems described above, and an objective of this disclosure is to suppress reduction in propelling force of a vehicle when an abnormality occurs in any of the power converters.

Solution to Problem

In order to accomplish the objective above, the propulsion control device of the present disclosure is provided with a plurality of power converters, an output controller, an abnormality detector and a determiner. The plurality of power converters output power to drive main electric motors for driving wheels. The output controller controls the output of a power converter of the plurality of power converters. The abnormality detector detects whether an abnormality is occurring in the power converter. The determiner determines, when a value that is based on a number of power converters in which an abnormality is occurring, among the plurality of power converters, and that indicates amount of reduction in propelling force of a vehicle, satisfies a judgment criterion, that an increase is required in the output of at least one of the power converters in which no abnormality is occurring, among the plurality of power converters, to a level higher than a normal output that is an output when no abnormality is occurring in any of the plurality of power converters. Moreover, the output controller performs control so that the output of the power converter, for which the determiner determines that the increase is required in the output to the level higher than the normal output, becomes higher than the normal output.

Advantageous Effects of Invention

According to the present disclosure, reduction can be suppressed in propelling force of a vehicle when an abnormality occurs in any of the power converters.

DESCRIPTION OF EMBODIMENTS

Embodiments of the present disclosure are described hereinafter in reference to the drawings. The same reference signs denote the same or similar portions throughout the drawings.

First Embodiment

Figure 1:
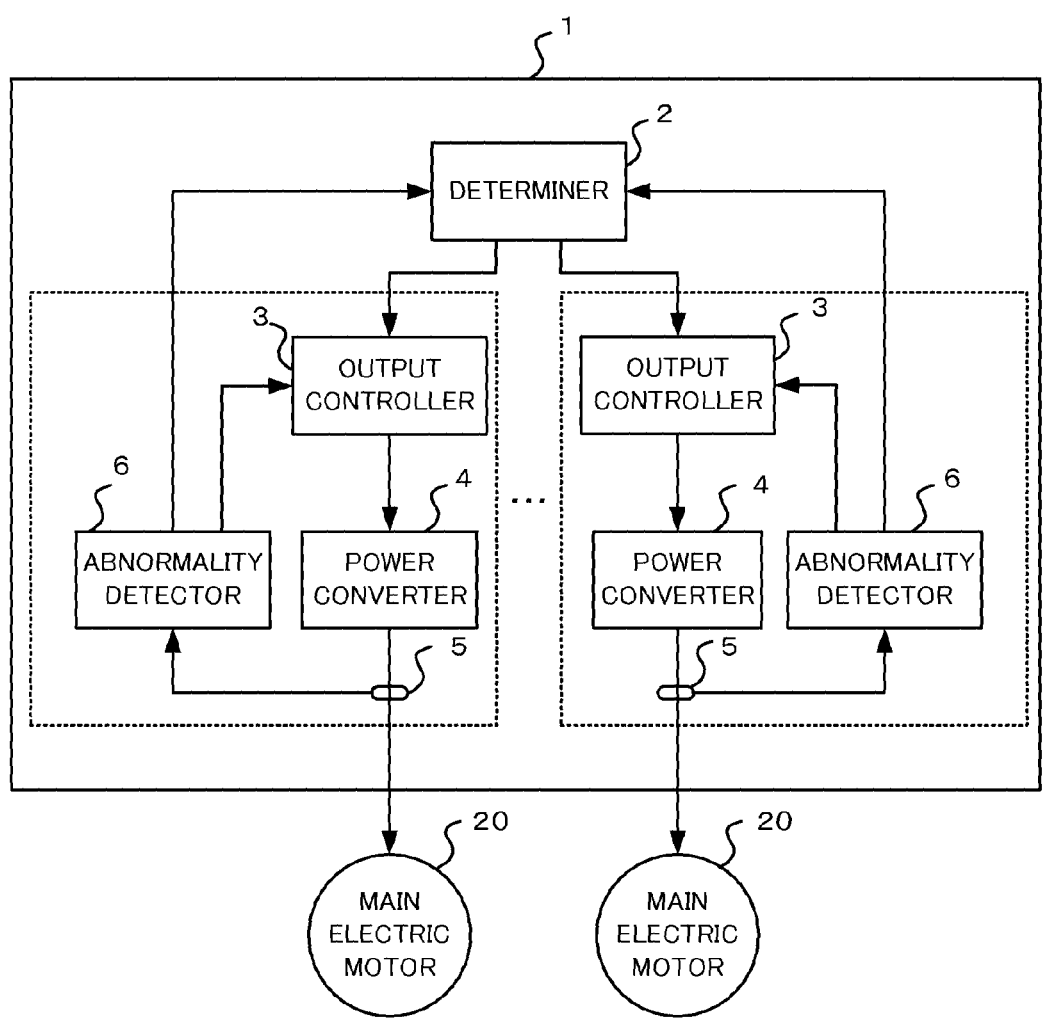
FIG. 1 is a block diagram illustrating a configuration example of a propulsion control device according to a first embodiment of the present disclosure.

FIG. 1 is a block diagram illustrating a configuration example of a propulsion control device according to a first embodiment of the present disclosure. The propulsion control device 1 is provided with a determiner 2, output controllers 3, power converters 4, electric current detectors 5 and abnormality detectors 6. The propulsion control device 1 is provided with any number of two or more power converters. For example, the propulsion control device 1 is provided with any number of two or more assemblies of an output controller 3, a power converter 4, an electric current detector 5 and an abnormality detector 6, each assembly being surrounded by a dashed line in FIG. 1. The power converters 4 drive main electric motors 20 by converting and outputting electric power that is input. In the example of FIG. 1, a power converter 4 drives one main electric motor 20, however, a configuration is possible so that a power converter 4 drives multiple main electric motors 20. The main electric motors 20 are driven and propelling force is generated in an electric vehicle. When no abnormality is occurring in any of the power converters 4, the output controllers 3 control the power converters 4 based on, for example, an operating instruction that includes a power instruction and brake instruction from a driver's cab (not illustrated in the figures). An output of each power converter 4 based on an operating instruction when no abnormality is occurring in any of the power converters 4 is defined as a normal output.

The operation of the propulsion control device 1 when an abnormality occurs in any of the power converters 4 is described. The abnormality detector 6 detects whether an abnormality is occurring in a power converter 4 based on electric current that the power converter 4 outputs and the electric current detector 5 detects. For example, when the electric current that the power converter 4 outputs is outside a specified range, or when the rate of change of the electric current is outside a specified range, the abnormality detector 6 detects an occurrence of an abnormality in the power converter 4. Moreover, the abnormality detector 6 can also detect whether an abnormality is occurring in the power converter 4 based on output voltage of the power converter 4 that is detected by a voltage detector, instead of the electric current detector 5. When the abnormality detector 6 detects an occurrence of an abnormality in the power converter 4, the abnormality detector 6 notifies the determiner 2 and output controller 3 of the occurrence of the abnormality.

When a value that is based on a number of power converters 4 in which an abnormality is occurring, among the total power converters 4, and that indicates amount of reduction in the propelling force of a vehicle satisfies a judgment criterion, the determiner 2 determines that an increase is required in the output of at least one of the power converters 4 in which no abnormality is occurring, among the total power converters 4, to a level higher than the normal output. When the number of power converters 4 in which an abnormality is occurring is equal to or greater than a threshold value, for example, the determiner 2 determines an increase is required in the output of at least one of the power converters 4 in which no abnormality is occurring, to a level higher than the normal output.

When the output controller 3 is notified by the abnormality detector 6 of the occurrence of an abnormality in the power converter 4 that is the target of control, the output controller 3 stops the power converter 4. Moreover, when determination is made by the determiner 2 that an increase is required in the output of the power converter 4 that is the target of control to a level higher than the normal output, the output controller 3 performs control so that the output of the power converter 4 becomes higher than the normal output. By increasing the output of the power converter 4, reduction can be suppressed in the propelling force of the vehicle when an abnormality occurs in any of the power converters 4.

Figure 2:
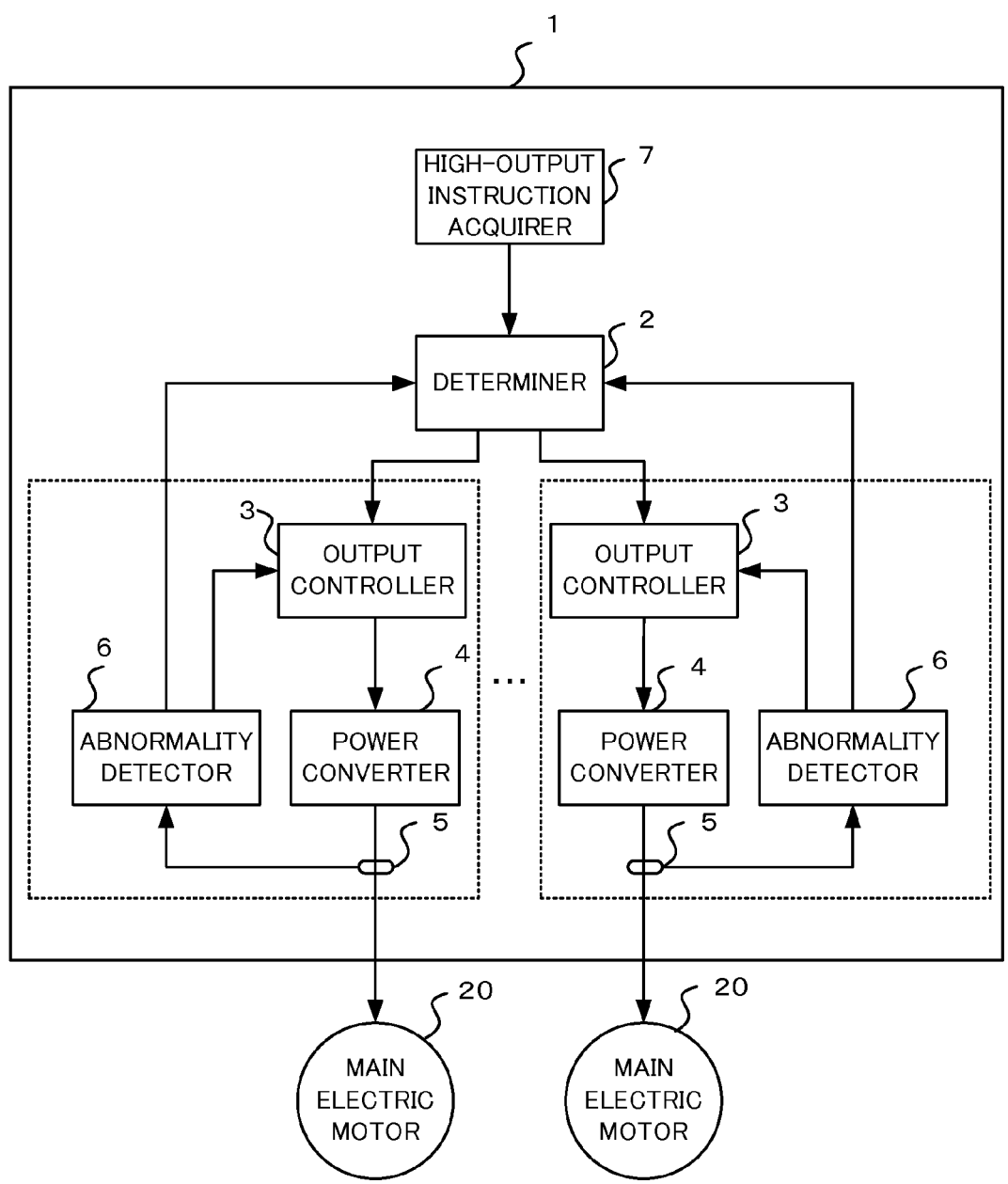
FIG. 2 is a block diagram illustrating another configuration example of the propulsion control device according to the first embodiment.

FIG. 2 is a block diagram illustrating another configuration example of the propulsion control device according to the first embodiment. In addition to the configuration of the propulsion control device 1 illustrated in FIG. 1, a high-output instruction acquirer 7 is provided. For example, when a high-output instruction switch that is provided in the driver's cab is operated by an operator, the high-output instruction acquirer 7 acquires an instruction to increase the output of the power converter 4 and sends that instruction to the determiner 2. When the determiner 2 acquires the instruction from the high-output instruction acquirer 7, or when the value that indicates the amount of reduction in the propelling force of the vehicle satisfies the judgment criterion such as in the case of the propulsion control device 1 illustrated in FIG. 1, the determiner 2 determines that an increase is required in the output of at least one of the power converters 4 in which no abnormality is occurring to a level higher than the normal output. Then, as in the case of the propulsion control device 1 illustrated in FIG. 1, the output controller 3 performs control so that the output of the power converter 4, for which the determiner 2 determines that an increase is required in the output, becomes higher than the normal output.

Figure 3:
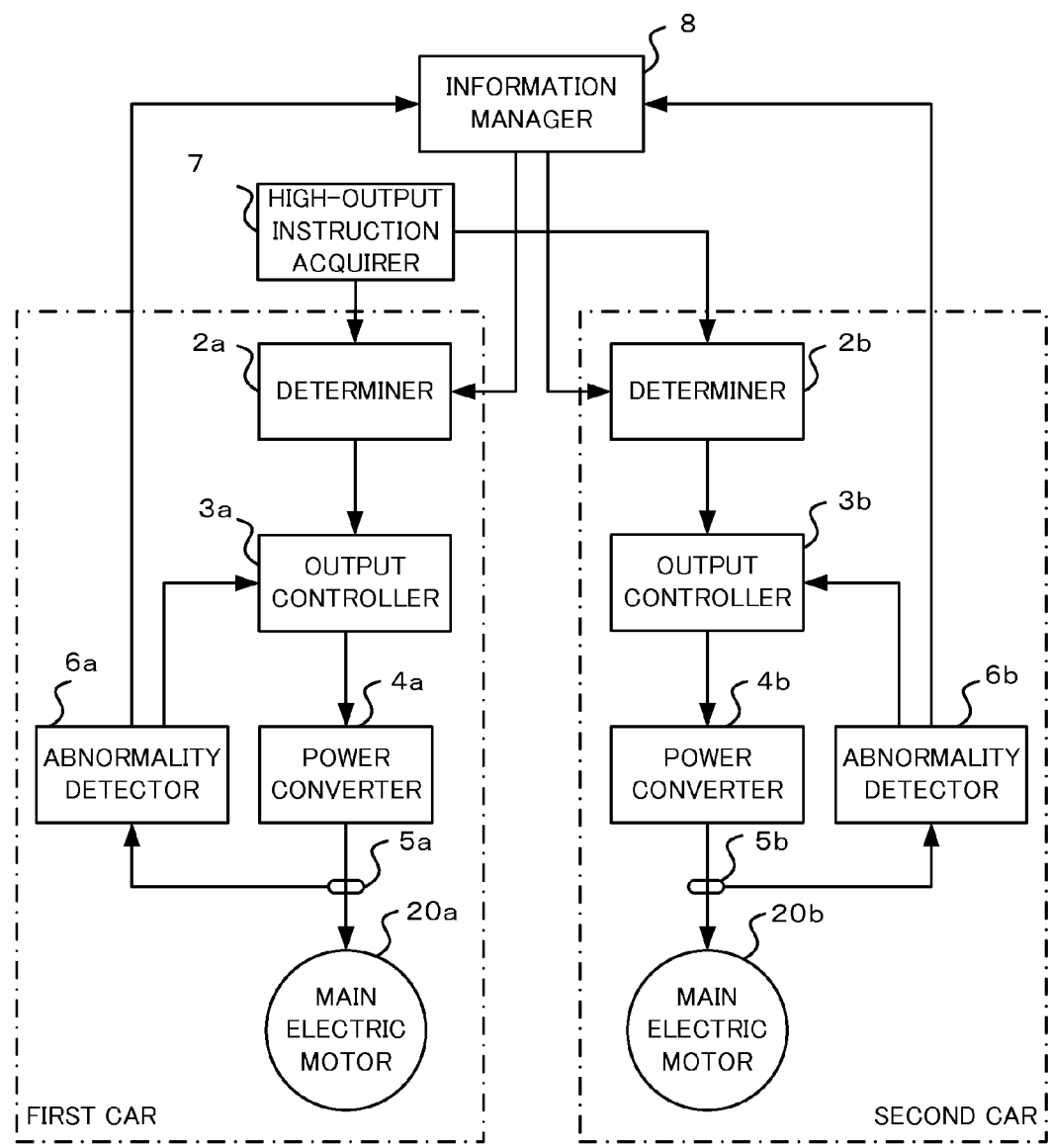
FIG. 3 is a block diagram illustrating an arrangement example of the propulsion control device according to the first embodiment.

FIG. 3 is a block diagram illustrating an arrangement example of the propulsion control device according to the first embodiment. FIG. 3 illustrates an example in which each part of the propulsion control device 1 and main electric motors 20 illustrated in FIG. 2 are arranged in the electric vehicle that includes multiple cars. For ease of understanding the example, the electric vehicle that includes a first car and a second car is described.

A determiner 2a, an output controller 3a, a power converter 4a, an electric current detector 5a and an abnormality detector 6a are arranged in the first car, and a determiner 2b, an output controller 3b, a power converter 4b, an electric current detector 5b and an abnormality detector 6b are arranged in the second car. The power converter 4a drives a main electric motor 20a, and the power converter 4b drives a main electric motor 20b. The output controllers 3a and 3b, for example, have two modes: a normal mode and a high-output mode; and when no abnormality is occurring in either of the power converters 4a or 4b, the output controllers 3a and 3b control the power converters 4a and 4b based on operation instructions in the normal mode. The high-output instruction acquirer 7 and an information manager 8 can also be arranged in any one of the cars. The information manager 8 receives, from the abnormality detectors 6a and 6b, information that indicates whether an abnormality is occurring in the power converters 4a and 4b, calculates the number of the power converters in which an abnormality is occurring, among the power converters 4a and 4b in the electric vehicle, and sends the calculated number to the determiners 2a and 2b.

Moreover, the information manager 8 can also display the calculated number of the power converters in which an abnormality is occurring, among the power converters 4a and 4b on a monitor on the control panel. In this case, the operator can check the number of power converters displayed on the monitor, and operate the high-output instruction switch.

Operation of the propulsion control device 1 when an abnormality occurs in the power converter 4a, and the high-output instruction acquirer 7 does not acquire an instruction, is described as an example. The abnormality detector 6a detects that an abnormality occurs in the power converter 4a based on the electric current that the power converter 4a outputs and the electric current detector 5a detects, and notifies the output controller 3a and the information manager 8 of the occurrence of an abnormality in the power converter 4a. After receiving the notification, the output controller 3a stops the power converter 4a. The abnormality detector 6b does not detect an abnormality, and thus does not notify either the output controller 3b or information manager 8.

The information manager 8 calculates the number of power converters in which an abnormality is occurring, among the power converters 4a and 4b, as 1, and sends the calculated number to the determiners 2a and 2b. The determiners 2a and 2b determine whether an instruction is previously acquired from the high-output instruction acquirer 7, and determine whether the number of power converters in which an abnormality is occurring, and that is previously received from the information manager 8, is equal to or greater than a threshold value. When the threshold value is taken to be 1, the number of power converters in which an abnormality is occurring, and that is previously received from the information manager 8 is equal to or greater than the threshold value of 1, and thus the determiners 2a and 2b send mode signals to the output controllers 3a and 3b giving instructions to perform control in the high-output mode.

Although the output controller 3a receives a mode signal giving an instruction to perform control in the high-output mode, the output controller 3a is previously notified by the abnormality detector 6a of the occurrence of an abnormality in the power converter 4a, and thus output controller 3a continues the stopped state of the power converter 4a. The output controller 3b receives a mode signal giving an instruction to perform control in the high-output mode, then switches from the normal mode to the high-output mode, and by performing control so that the output electric current from the power converter 4b, for example, increases, and the output of the power converter 4b becomes higher than the normal output. Even when an abnormality occurs in the power converter 4a, by increasing the output of the power converter 4b in which no abnormality is occurring to a level higher than the normal output, reduction can be suppressed in the propelling force of the vehicle.

When the threshold value is taken to be 2 or greater, the number of power converters in which an abnormality is occurring, and that is previously received from the information manager 8, is not equal to or greater than the threshold value of 2, and thus the determiners 2a and 2b send mode signals to the output controllers 3a and 3b giving instructions to perform control in the normal mode. The output controller 3a continues the stopped state of the power converter 4a, and the output controller 3b controls the output of the power converter 4b in the normal mode.

Hereafter, an example of a case in which an instruction is acquired by the high-output instruction acquirer 7 is described. As in the example described above, the abnormality detector 6a notifies the output controller 3a and the information manager 8 of the occurrence of an abnormality in the power converter 4a. After receiving the notification, the power controller 3a stops the power converter 4a. The abnormality detector 6b does not detect an abnormality, and thus does not notify either the output controller 3b or the information manager 8.

The information manager 8 calculates the number of power converters in which an abnormality is occurring, among the power converters 4a and 4b, as 1, and sends the calculated number to the determiners 2a and 2b. The determiners 2a and 2b determine whether an instruction is previously acquired from the high-output instruction acquirer 7, and determine whether the number of power converters in which an abnormality is occurring, and that is previously received from the information manager 8, is equal to or greater than the threshold value. When the threshold value is taken to be 2, the number of power converters in which an abnormality occurs, and that is previously received from the information manager 8, is not equal to or greater than the threshold value of 2, however, an instruction is previously acquired from the high-output instruction acquirer 7, and thus the determiners 2a and 2b send mode signals to the output controllers 3a and 3b giving instructions to perform control in the high-output mode. Later processing is the same as in the example described above. When an instruction is acquired from the high-output instruction acquirer 7 even though the value that indicates reduction in the propelling force does not satisfy the judgment criterion, by increasing the output of the power converter 4b in which no abnormality is occurring to a level higher than the normal output, reduction can be suppressed in the propelling force of the vehicle.

When an instruction is acquired by the high-output instruction acquirer 7, the determiners 2a and 2b can relax the judgment criterion, or in other words, can make the aforementioned threshold value small. In the example described above, when an instruction is acquired from the high-output instruction acquirer 7 and the determiners 2a and 2b change the threshold value from 2 to 1, the number of power converters in which an abnormality is occurring, and that is previously received from the information manager 8 is equal to or greater than the threshold value of 1, and thus the determiners 2a and 2b send mode signals to the output controllers 3a and 3b giving instructions to perform control in the high-output mode.

Without providing of the information manager 8, the determiners 2a and 2b that are previously notified by the abnormality detectors 6a and 6b of an occurrence of an abnormality in the power converters 4a and 4b respectively can notify the occurrence of the abnormality each other, and calculate the number of the power converters in which an abnormality is occurring, among the power converters 4a and 4b.

Figure 4:
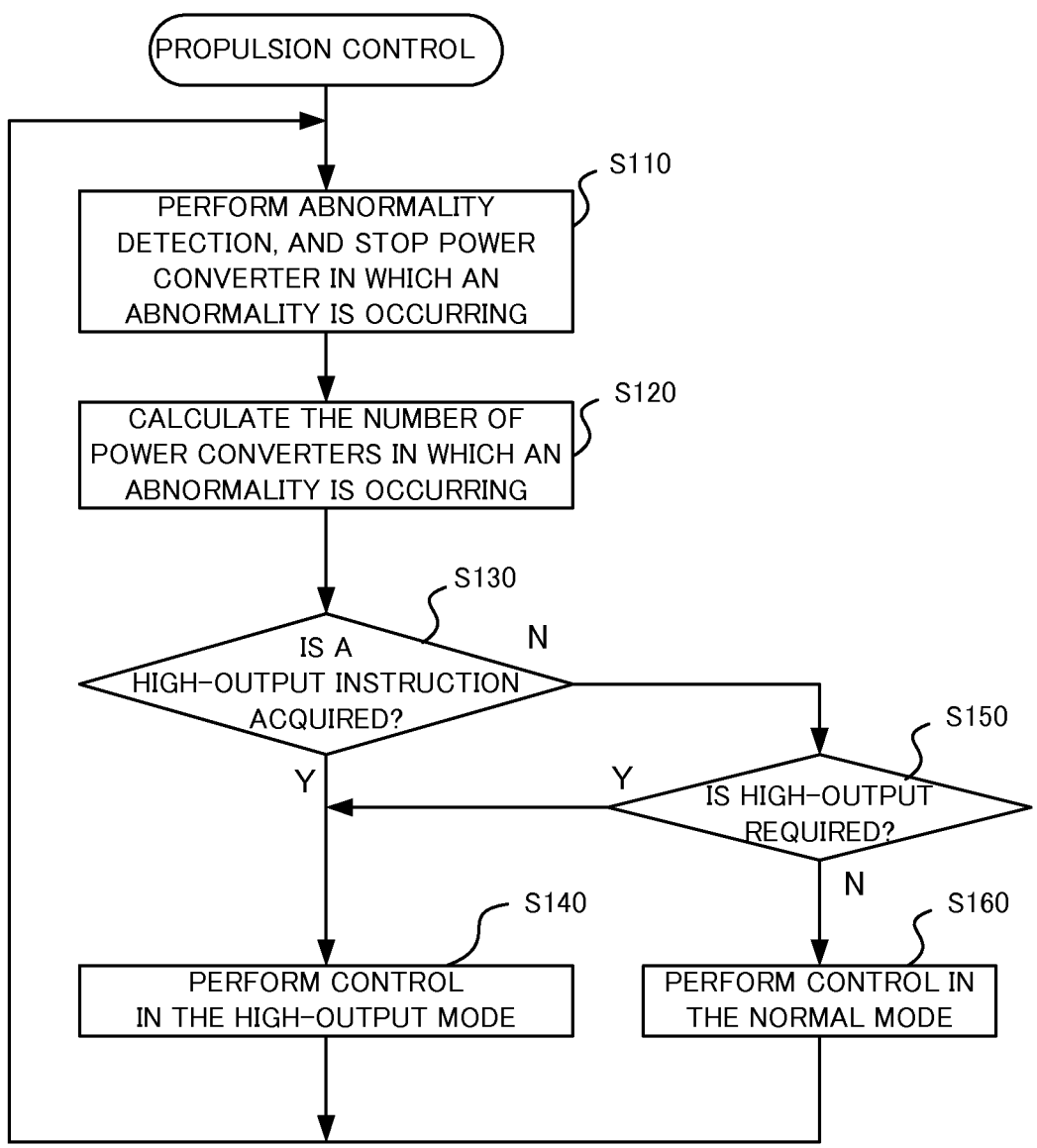
FIG. 4 is a flowchart illustrating an example of the operation of propulsion control that is performed by the propulsion control device according to the first embodiment.

FIG. 4 is a flowchart illustrating an example of the operation of propulsion control that is performed by the propulsion control device according to the first embodiment. An example is described in which an abnormality occurs in the power converter 4a. The abnormality detector 6a detects the occurrence of an abnormality in the power converter 4a, and the output controller 3a stops the power converter 4a (step S110). The information manager 8 calculates the number of the power converters in which an abnormality is occurring, among the power converters 4a and 4b (step S120). When an instruction is acquired by the high-output instruction acquirer 7 (step S130; Y), the determiners 2a and 2b send mode signals to the output controllers 3a and 3b giving instructions to perform control in the high-output mode. The output controller 3a is previously notified by the abnormality detector 6a of the occurrence of an abnormality in the power converter 4a, and thus the output controller 3a continues the stopped state of the power converter 4a, and the output controller 3b switches from the normal mode to the high-output mode and controls the output of the power converter 4b (step S140).

When an instruction is not acquired by the high-output instruction acquirer 7 (step S130; N), the determiners 2a and 2b determine whether an increase in the output to a level higher than the normal output is required based on the number of power converters in which an abnormality is occurring, that is previously received from the information manager 8, is equal to or greater than the threshold value. When the number of power converters in which an abnormality is occurring is equal to or greater than the threshold value, the determiners 2a, and 2b determine that an increase is required in the output to a level higher than the normal output (step S150; Y), and send mode signals to the output controllers 3a and 3b giving instructions to perform control in the high-output mode. The output controller 3a is previously notified by the abnormality detector 6a of the occurrence of an abnormality in the power converter 4a, and thus the output controller 3a continues the stopped state of the power converter 4a, and the output controller 3b switches from the normal mode to the high-output mode and controls the output of the power converter 4b (step S140).

When the number of power converters in which an abnormality is occurring is not equal to or greater than the threshold value, the determiners 2a and 2b determine that an increase is not required in the output to a level higher than the normal output (step S150; N), and send mode signals to the output controllers 3a, 3b giving an instruction to perform control in the normal mode. The output controller 3a is previously notified by the abnormality detector 6a of the occurrence of an abnormality in the power controller 4a, and thus the output controller 3a continues the stopped state of the power converter 4a, and the output controller 3b controls the output of the power converter 4b in the normal mode (step S160). The propulsion control device 1 repeats the process described above.

The threshold value can be changed according to the number of cars. For example, in the case of eight cars, the threshold value can be taken to be 1, and in the case of twelve cars, the threshold value can be taken to be 2.

As described above, by use of the propulsion control device 1 according to the first embodiment, reduction can be suppressed in the propelling force of the vehicle when an abnormality occurs in any of the power converters 4.

Second Embodiment

Figure 5:
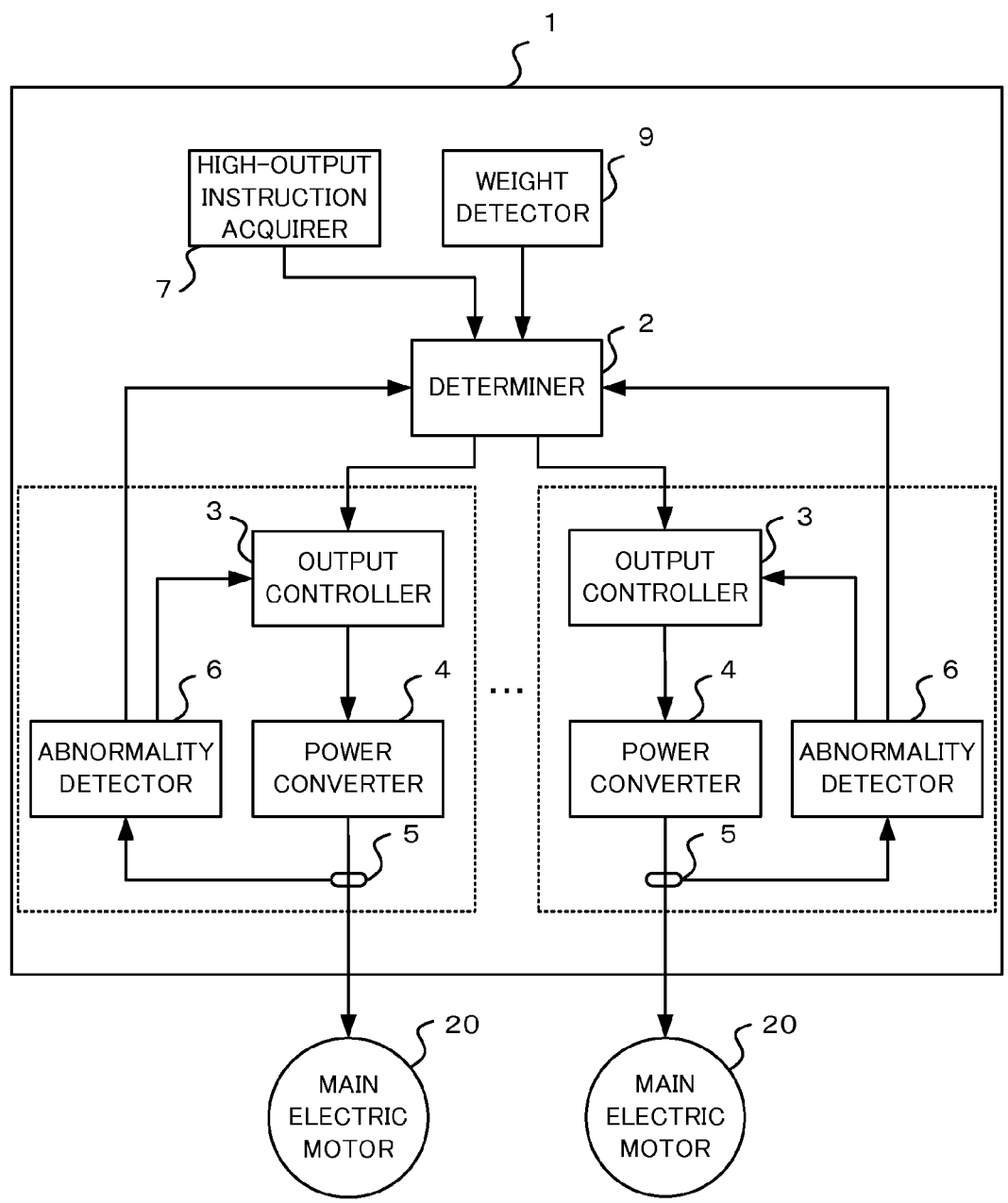
FIG. 5 is a block diagram illustrating a configuration example of a propulsion control device according to a second embodiment of the present disclosure.

FIG. 5 is a block diagram illustrating a configuration example of a propulsion control device according to a second embodiment of the present disclosure. In addition to the configuration of the propulsion control device 1 illustrated in FIG. 2, a weight detector 9 is provided. The weight detector 9 can be added to the configuration of the propulsion control device 1 illustrated in FIG. 1. The operation of each part of the propulsion control device 1 that differs from that of the first embodiment is described.

The weight detector 9 calculates the sum of the product of the number of cars and the empty car weight that is a preset value, and the weight that varies according to the number of passengers and that is detected by a load detector for each car as vehicle weight, and sends the calculated vehicle weight to a determiner 2. The empty car weight is the weight of a car including all of the equipment installed in the car when there are no passengers. When the number of cars is taken to be C, and the empty car weight is taken to be $W_0$, and the sum of the weight that is detected by the load detector for each car is taken to be W, the vehicle weight is expressed as $C \cdot W_0 + W$. When the empty car weight differs for each vehicle car, the total of the empty car weights of each car is used instead of $C \cdot W_0$.

The determiner 2 for each car calculates the acceleration "a" of the vehicle as expressed by Equation (1) below based on the number M of power converters 4 in which an abnormality is occurring, the maximum value $P_{max}$ of the output of the power converter 4 that is a preset value, the total number N of power converters 4, and the vehicle weight that is sent from the weight detector 9. Power converters having the same performance are used as the power converters 4, and thus the maximum values $P_{max}$ of the power converters 4 are the same. In the equation, K is a constant for unit conversion. The weight is the product of mass and gravitational acceleration. When calculating the weight in units so that the measurement value of the weight coincides with the mass, the acceleration "a" of the vehicle can be calculated using the weight as below.

[Equation 1]

$$a = \frac{P_{max} \cdot \frac{M}{N}}{C \cdot W_0 + W} \cdot K \quad (1)$$

When the acceleration "a" of the vehicle is equal to or less than a threshold value, the determiner 2 determines that an increase is required in the output of at least one of the power converters 4 in which no abnormality is occurring to a level higher than the normal output.

Figure 6:
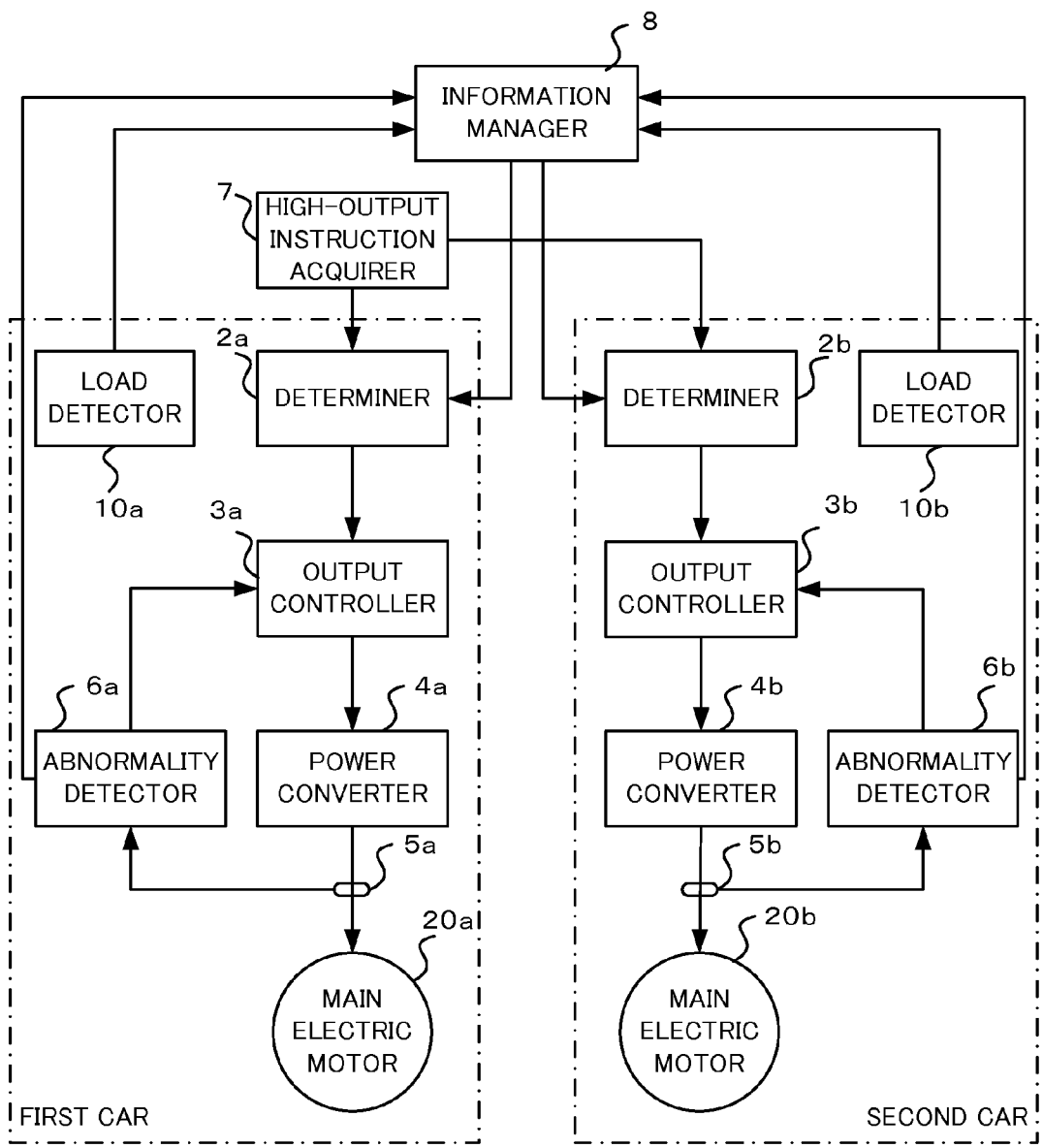
FIG. 6 is a block diagram illustrating an arrangement example of the propulsion control device according to the second embodiment.

FIG. 6 is a block diagram illustrating an arrangement example of the propulsion control device according to the second embodiment. In addition to the configuration in FIG. 3, load detectors 10a and 10b are respectively arranged in the first car and the second car. The load detectors 10a and 10b detect the weight, and send the detected weight to an information manager 8. The information manager 8 calculates the vehicle weight as the sum of the product of the number of cars and the empty car weight that is a preset value, and the weights detected by the load detectors 10a and 10b in each car, and sends the calculated vehicle weight to determiners 2a and 2b. In other words, the information manager 8 and the load detectors 10a and 10b work together to perform the operation of the weight detector 9.

Operation of the propulsion control device 1 when an abnormality occurs in a power converter 4a, and a high-output instruction acquirer 7 does not acquire an instruction, is described as an example. As in the first embodiment, an abnormality detector 6a detects that an abnormality occurs in the power converter 4a based on the electric current that the power converter 4a outputs and an electric current detector 5a detects, and notifies an output controller 3a and the information manager 8 of the occurrence of an abnormality in the power converter 4a. After receiving the notification, the output controller 3a stops the power converter 4a. An abnormality detector 6b does not detect an abnormality, and thus does not notify either an output controller 3b or the information manager 8.

The information manager 8 calculates the number of the power converters in which an abnormality is occurring, among the power converters 4a and 4b, as 1, and calculates the vehicle weight, then sends the calculated values to the determiners 2a and 2b. The determiners 2a and 2b determine whether an instruction is previously acquired from the high-output instruction acquirer 7, and determine whether the acceleration of the vehicle calculated according to Equation (1) above is equal to or less than the threshold value. When the acceleration of the vehicle is equal to or less than the threshold value, the determiners 2a and 2b send mode signals to the output controllers 3a and 3b giving instructions to perform control in the high-output mode.

As in the first embodiment, although the output controller 3a receives a mode signal giving an instruction to perform control in the high-output mode, the output controller 3a is previously notified by the abnormality detector 6a of the occurrence of an abnormality in the power converter 4a, and thus the output controller 3a continues the stopped state of the power converter 4a. The output controller 3b receives a mode signal giving an instruction to perform control in the high-output mode, then switches from the normal mode to the high-output mode, and by controlling the output of the power converter 4b, increases the output of the power converter 4b to a level higher than the normal output. By increasing the output of the power converter 4b in which no abnormality is occurring to a level higher than the normal output even when an abnormality occurs in the power converter 4a, reduction can be suppressed in the propelling force of the vehicle.

Moreover, when the acceleration of the vehicle is not equal to or less than the threshold value, the determiners 2a and 2b send mode signals to the output controllers 3a and 3b giving instructions to perform control in the normal mode. The output controller 3a continues the stopped state of the power converter 4a, and the output controller 3b controls the output of the power converter 4b in the normal mode.

Hereafter, an example of the case in which an instruction is acquired by the high-output instruction acquirer 7 is described. As in the example described above, the abnormality detector 6a notifies the output controller 3a and the information manager 8 of the occurrence of an abnormality in the power converter 4a. After receiving the notification, the output controller 3a stops the power converter 4a. The abnormality detector 6b does not detect an abnormality, and thus does not notify either the output controller 3b or the information manager 8.

The information manager 8 calculates the number of power converters in which an abnormality is occurring, among the power converters 4a and 4b, as 1, and calculates the vehicle weight, then sends the calculated values to the determiners 2a and 2b. The determiners 2a and 2b determine whether an instruction is previously acquired from the high-output instruction acquirer 7, and determines whether the acceleration of the vehicle calculated according to Equation (1) above is equal to or less than the threshold value. Even when the acceleration of the vehicle is not equal to or less than the threshold value, an instruction is previously acquired from the high-output instruction acquirer 7, and thus the determiners 2a and 2b send mode signals to the output controllers 3a and 3b giving instructions to perform control in the high-output mode. Later processing is the same as the example described above. By increasing the output of the power converter 4b in which no abnormality is occurring to a level higher than the normal output when an instruction is acquired from the high-output instruction acquirer 7 even though the acceleration of the vehicle is not equal to or less than the threshold value, reduction can be suppressed in the propelling force of the vehicle.

Without providing of the information manager 8, the determiners 2a and 2b that are previously notified by the abnormality detectors 6a and 6b of the occurrence of an abnormality in the power converters 4a and 4b respectively can notify the occurrence of the abnormality each other, and calculate the number of power converters of the power converters 4a and 4b in which an abnormality is occurring, among the power converters 4a and 4b. The determiners 2a and 2b that previously receive signals indicating the weight from the load detectors 10a and 10b can communicate with each other, calculate the vehicle weight, and then calculate the acceleration of the vehicle based on Equation (1) above.

The operation of the propulsion control that is performed by the propulsion control device 1 according to the second embodiment is the same as that of the operation performed by the propulsion control device 1 according to the first embodiment illustrated in FIG. 4. However, in step S120, in addition to the number of power converters in which an abnormality is occurring, the vehicle weight is also calculated. Moreover, in step S150, as described above, whether an increase is required in the output is determined based on whether the acceleration of the vehicle is equal to or less than the threshold value.

As described above, by use of the propulsion control device 1 according to the second embodiment, reduction can be suppressed in the propelling force of the vehicle when an abnormality occurs in any of the power converters 4.

Third Embodiment

A configuration example of a propulsion control device according to a third embodiment of the present disclosure is the same as that of the propulsion control devices 1 according to the first and second embodiments. However, a determiner 2 of the propulsion control device 1 according to the third embodiment changes the judgment criterion based on an incline at a location where the vehicle is traveling. For example, when the incline at the location where the vehicle is traveling is equal to or greater than a threshold value, the determiner 2 relaxes the judgment criterion. In other words, when the incline at the location where the vehicle is traveling is equal to or greater than the threshold value, the determiner 2 changes a threshold value for the number of power converters 4 in which an abnormality is occurring to a small value, and then as in the first embodiment, when the number of power converters 4 in which an abnormality is occurring is equal to or greater than the threshold value, the determiner 2 determines that an increase is required in the output of at least one of the power converters 4 in which no abnormality is occurring to a level higher than the normal output. Moreover, when the incline at the location where the vehicle is traveling is equal to or greater than the threshold value, for example, the determiner 2 changes a threshold value for the acceleration of the vehicle to a large value. Then, as in the second embodiment, when the acceleration of the vehicle is equal to or less than the threshold value, the determiner 2 determines an increase is required in the output of at least one of the power converters 4 in which no abnormality is occurring to a level higher than the normal output. When the incline at the location where the vehicle is traveling is not equal to or greater than the threshold value, the determiner 2 does not change the judgment criterion.

An information manager 8 of the propulsion control device 1 according to the third embodiment stores information about the incline of the track on which the vehicle travels, and information about the incline of the track for each section of track, for example. The information manager 8 receives information about the location where the vehicle is traveling from an automatic train control (ATC) pickup, for example, and detects the incline at the location where the vehicle is traveling. The information manager 8 notifies determiners 2a and 2b of the detected incline at the location where the vehicle is traveling. When the incline at the location where the vehicle is traveling is equal to or greater than the threshold value, the determiners 2a and 2b change the threshold value for the number of power converters in which an abnormality is occurring, among power converters 4a and 4b, to a small value, and when the number of power converters in which an abnormality is occurring is equal to or greater than that threshold value, the determiners 2a and 2b determine that an increase is required in the output to a level higher than the normal output. The operation of the propulsion control that is performed by the propulsion control device 1 according to the third embodiment is the same as the operation in the first embodiment illustrated in FIG. 4. However, the judgment criterion in step S150 changes according to whether the incline at the location where the vehicle is traveling is equal to or greater than the threshold value.

As described above, by use of the propulsion control device 1 according to the third embodiment, and by changing the judgment criterion based on the incline at the location where the vehicle is traveling, the amount of suppression of the reduction in the propelling force of the vehicle can be changed.

Fourth Embodiment

Figure 7:
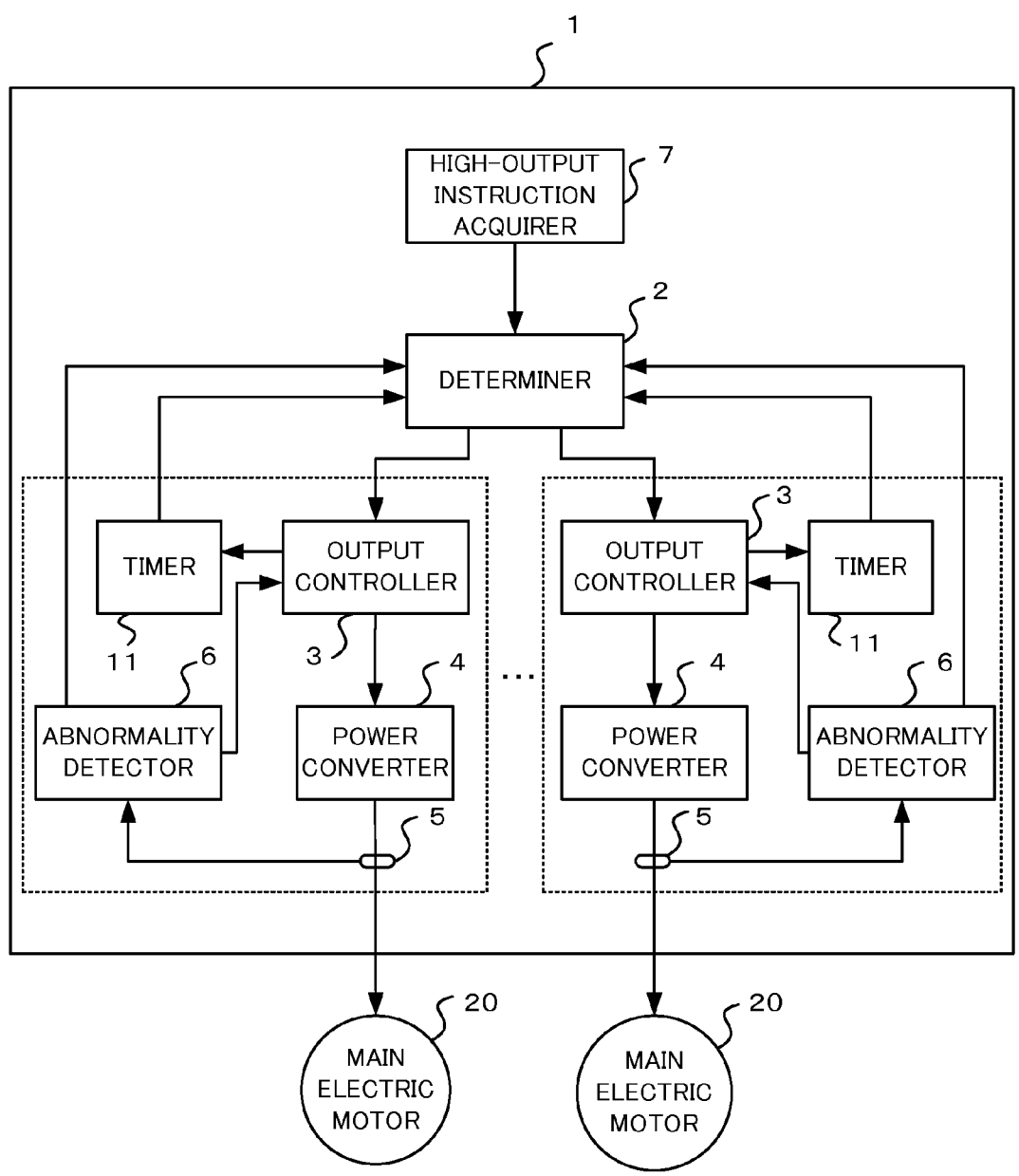
FIG. 7 is a block diagram illustrating a configuration example of a propulsion control device according to a fourth embodiment of the present disclosure.

FIG. 7 is a block diagram illustrating a configuration example of a propulsion control device according to a fourth embodiment of the present disclosure. In addition to the configuration of the propulsion control device 1 illustrated in FIG. 2, timers 11 are provided. The timers 11 can be added to the configuration of propulsion control device 1 illustrated in FIG. 1. The operation of each part of the propulsion control device 1 that differs from that of the first embodiment is described.

When the output of a power converter 4 continues in the high state for a long time, the power converter 4 becomes hot and the maintenance cycle time of the power converter 4 can become shorter. Therefore, a timer 11 measures an operating time of the power converter 4 in an output state that is higher than the normal output, and based on the operating time, determines whether operation is possible for the power converter 4 in the output state that is higher than the normal output, and sends the determination results to a determiner 2.

The timer 11 receives a mode signal from an output controller 3, for example, and when the timer 11 detects that the mode is switched from the normal mode to the high-output mode, starts measuring the operating time at high output. Thereafter, when the operating time at high output exceeds a threshold value, the timer 11 starts sending a stop signal to the determiner 2. Then the timer 11 receives a mode signal from the output controller 3, and when the timer 11 detects that the mode is switched from the high-output mode to the normal mode, stops measuring the operating time at high output and starts measuring the operating time at normal output. When the operating time at normal output exceeds a threshold value, the timer stops sending the stop signal to the determiner 2.

When a value that indicates the amount of reduction in the propelling force of the vehicle satisfies a judgment criterion, the determiner 2 determines that an increase is required in the output of at least one of the power converters 4 in which no abnormality is occurring, and for which the timer 11 determines that operation at high-output higher than the normal output is possible, to a level higher than the normal output. For example, when a value that includes the number of power converters 4 in which an abnormality is occurring, and that indicates the amount of reduction in the propelling force of the vehicle satisfies a judgment criterion, and there is no stop signal sent from the timer 11, the determiner 2 determines that an increase is required in the output of at least one of the power converters 4 in which no abnormality is occurring to a level higher than the normal output.

When the output controller 3 is notified by the abnormality detector 6 of the occurrence of an abnormality in the power converter 4, the output controller 3 stops the power converter 4. Moreover, the output controller 3 performs control so that the output of the power converter 4, in which no abnormality is occurring, and for which timer 11 determines that operation is possible in the output state that is higher than the normal output, becomes higher than the normal output. By increasing the output of the power converter 4, reduction can be suppressed in the propelling force of the vehicle due to abnormality in any of the power converters 4.

Even when the number of the power converters 4 in which an abnormality is occurring is equal to or greater than the threshold value, the output controller 3 performs control so that the output of the power converter 4 in which no abnormality is occurring, and for which timer 11 determines that operation is not possible in the output state that is higher than the normal output, becomes the normal output. The output of power converter 4 for which the timer 11 determines, based on the operating time, that operation is not possible in the output state that is higher than the normal output, becomes the normal output, and thus control can be performed so that the load on the power converter 4 does not become excessively high.

Figure 8:
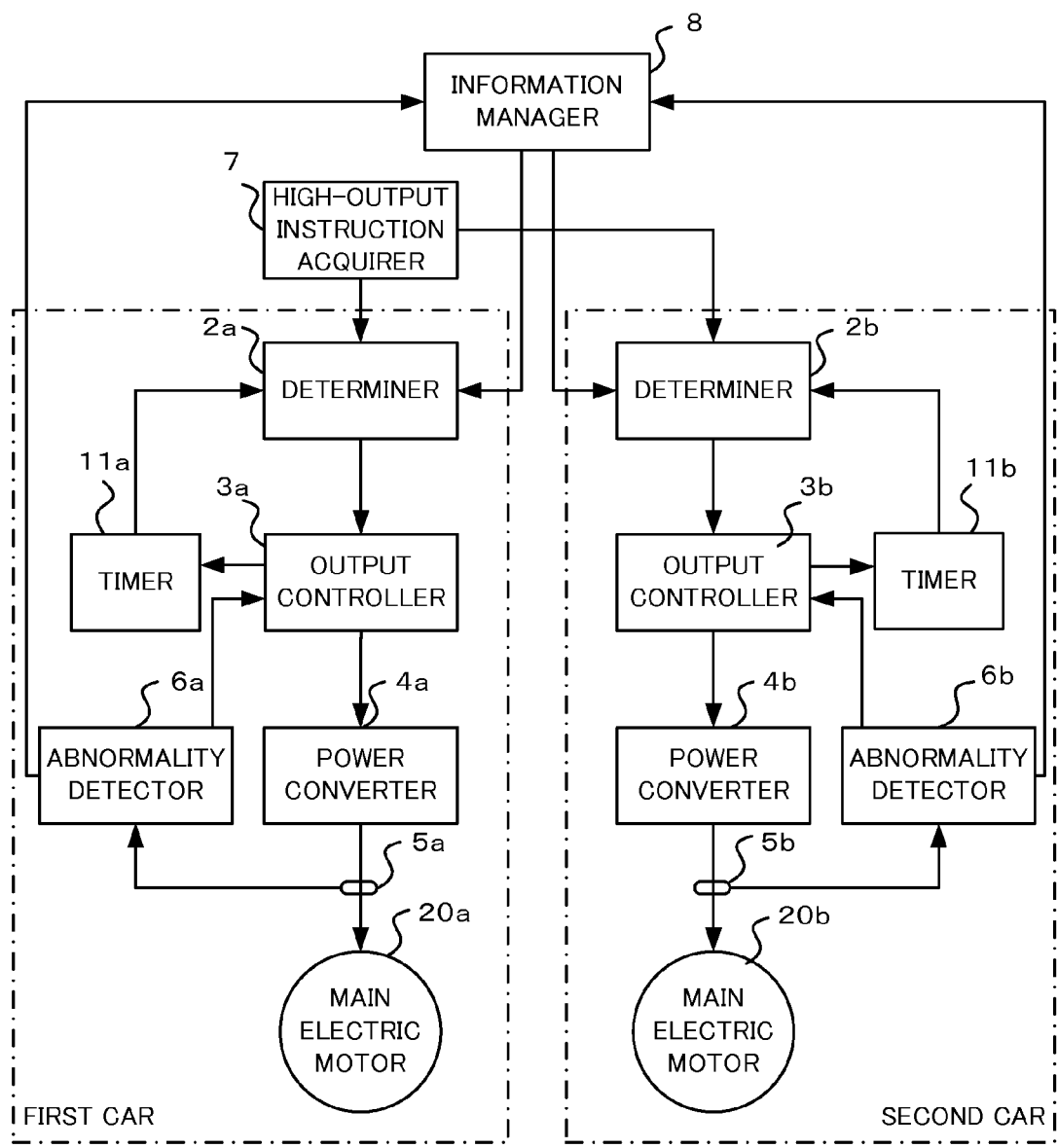
FIG. 8 is a block diagram illustrating an arrangement example of the propulsion control device according to the fourth embodiment.

FIG. 8 is a block diagram illustrating an arrangement example of the propulsion control device according to the fourth embodiment. In addition to the configuration illustrated in FIG. 3, timers 11a and 11b are respectively arranged in a first car and a second car. The timers 11a and 11b measure the operating time at high output of power converters 4a and 4b based on mode signals output from output controllers 3a and 3b, and when the operating time exceeds the threshold value, the timers 11a and 11b start sending stop signals to determiners 2a and 2b. Thereafter, when the operating time at normal output of the power converters 4a and 4b exceeds the threshold value, the timers 11a and 11b stop sending the stop signals to the determiners 2a and 2b.

Operation of the propulsion control device 1 when an abnormality occurs in the power converter 4a, and a high-output instruction acquirer 7 does not acquire an instruction, is described as an example. As in the first embodiment, an abnormality detector 6a detects that an abnormality occurs in the power converter 4a based on the electric current that the power converter 4a outputs and an electric-current detector 5a detects, and notifies the output controller 3a and an information manager 8 of the occurrence of an abnormality in the power converter 4a. After receiving the notification, the output controller 3a stops the power converter 4a. An abnormality detector 6b does not detect an abnormality, and thus does not notify either the output controller 3b or the information manager 8.

The information manager 8 calculates the number of the power converters in which an abnormality is occurring, among the power converters 4a and 4b, as 1, and sends the calculated number to the determiners 2a and 2b. The determiners 2a and 2b determine whether an instruction is previously acquired from the high-output instruction acquirer 7, and determine if a state exists in which the number of power converters in which an abnormality is occurring, and that is previously received from the information manager 8, is equal to or greater than a threshold value and stop signals are not being sent from the timers 11a and 11b. At the start of processing, the operating time is initialized to 0, and thus the timers 11a and 11b do not output stop signals. When the threshold value for the number of power converters in which an abnormality is occurring is taken to be 1, the number of power converters in which an abnormality is occurring, and that is previously received from the information manager 8, is equal to or greater than the threshold value of 1, and thus the determiners 2a and 2b send mode signals to the output controllers 3a and 3b and the timers 11a and 11b giving instructions to perform control in the high-output mode. The timers 11 and, 11b start measuring the operating time.

As in the first embodiment, although the output controller 3a receives a mode signal giving an instruction to perform control in the high-output mode, the output controller 3a is previously notified by the abnormality detector 6a of the occurrence of an abnormality in the power converter 4a, and thus the output controller 3a continues the stopped state of the power converter 4a. The output controller 3b receives a mode signal giving an instruction to perform control in the high-output mode, then switches from the normal mode to the high-output mode, and by controlling the output of the power converter 4b, increases the output of the power converter 4b to a level higher than the normal output. By increasing the output of the power converter 4b in which no abnormality is occurring to a level higher than the normal output even when an abnormality occurs in the power converter 4a, reduction can be suppressed in the propelling force of the vehicle.

As a result of repeatedly performing the processing described above, the power converter 4a remains stopped, and the operating time of the power converter 4b in the output that is higher than the normal output exceeds the threshold value. When the operating time at high output exceeds the threshold value, the timer 11b starts sending a stop signal to the determiner 2b. When the stop signal is sent from the timer 11b, even when the number of power converters in which an abnormality is occurring, and that is previously received from the information manager 8, is equal to or greater than the threshold value, the determiner 2b sends a mode signal to the output controller 3b and the timer 11b giving an instruction to perform control in the normal mode. The timer 11b stops measuring the operating time at high output, and starts measuring the operating time at normal output.

The output controller 3b receives a mode signal giving an instruction to perform control in the normal mode, and thus switches from the high-output mode to the normal mode, and controls the output of the power converter 4b so that the output of the power converter 4b returns to the normal output. Control can be performed so that the load on the power converter 4b does not become excessively high.

When the operating time at normal output exceeds the threshold value, the timer 11b stops sending the stop signal, and resets the measured operating time at high output and the operating time at normal output. The determiner 2b determines whether an instruction is previously acquired from the high-output instruction acquirer 7, and determines if a state exists in which the number of power converters in which an abnormality is occurring, and that is previously received from the information manager 8, is equal to or greater than the threshold value and there is no stop signal sent from the timer 11b. The number of power converters in which an abnormality is occurring, and that is previously received from the information manager 8, is equal to or greater than the threshold value of 1, and thus the determiner 2b sends a mode signal to the output controller 3b and the timer 11b giving an instruction to perform control in the high-output mode. In this way, the power converter 4b operates again in the high-output mode.

The operation when an instruction is acquired by the high-output instruction acquirer 7 is the same as the operation in the first embodiment, and by increasing the output of the power converter 4b in which no abnormality is occurring to a level higher than the normal output when an instruction is acquired from the high-output instruction acquirer 7 even though the number of power converters in which an abnormality is occurring is not equal to or greater than the threshold value, or even though there are stop signals output from the timers 11a and 11b, reduction can be suppressed in the propelling force of the vehicle.

Figure 9:
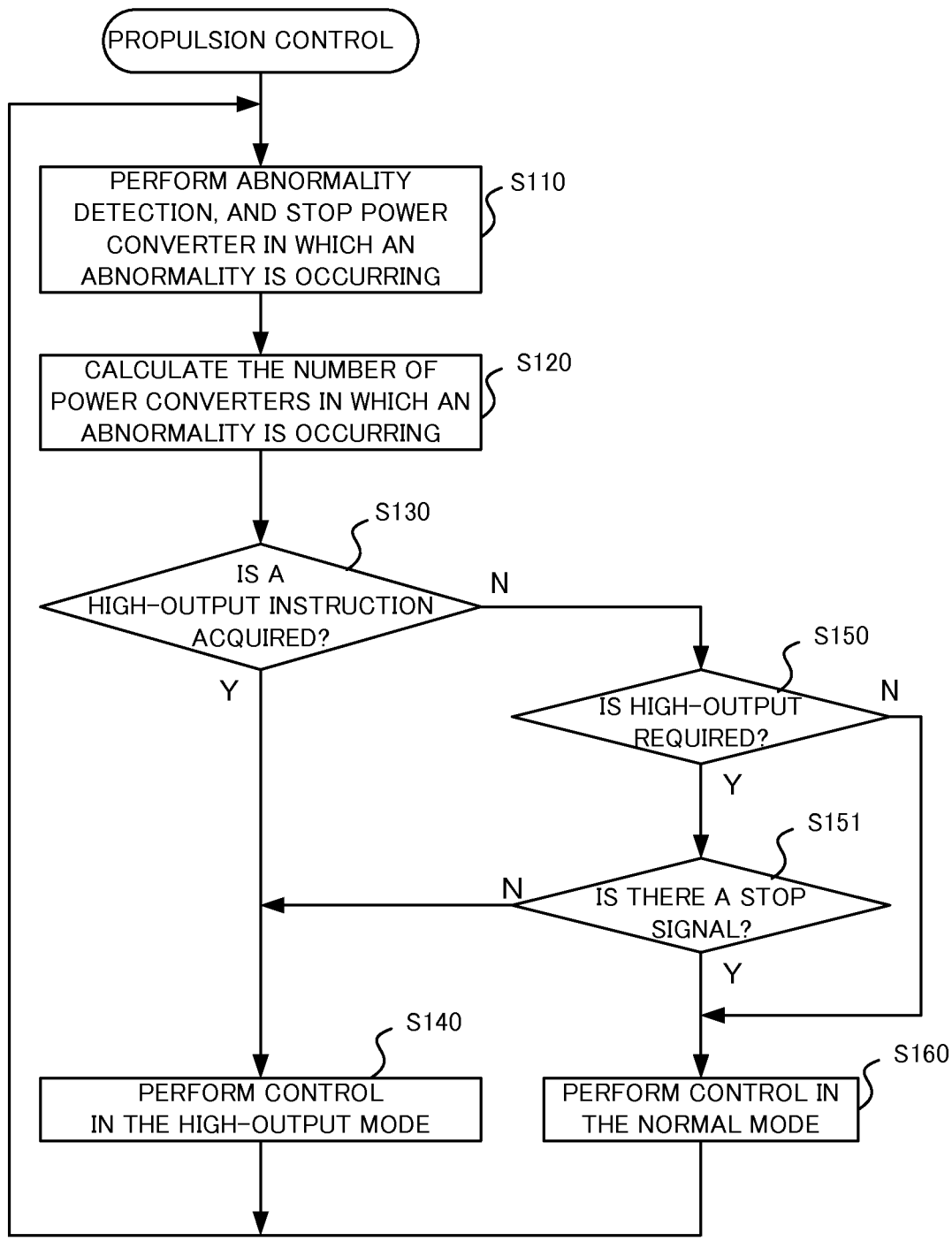
FIG. 9 is a flowchart illustrating an example of the operation of propulsion control that is performed by the propulsion control device according to the fourth embodiment.

FIG. 9 is a flowchart illustrating an example of operation of propulsion control that is performed by the propulsion control device according to the fourth embodiment. An example is described in which an abnormality occurs in the power converter 4a. The operation from step S110 to step S140 is the same as the operation that is performed by the propulsion control device 1 according to the first embodiment illustrated in FIG. 4. When an instruction is not acquired by the high-output instruction acquirer 7 (step S130; N), the number of power converters in which an abnormality is occurring is determined to be equal to or greater than the threshold value and an increase is required in the output to a level higher than the normal output (step S150; Y), and the determiners 2a and 2b are not receiving stop signals (step S151; N), the determiners 2a and 2b send mode signals to the output controllers 3a and 3b giving instructions to perform control in the high-output mode. The output controller 3a is previously notified by the abnormality detector 6a of the occurrence of an abnormality in the power converter 4a, and thus the output controller 3a continues the stopped state of the power converter 4a, and the output controller 3b switches from the normal mode to the high-output mode, and controls the output of the power converter 4b (step S140).

When an instruction is not acquired by the high-output instruction acquirer 7 (step S130; N), determination is made that an increase is required in the output of the power converters 4 in which no abnormality is occurring to a level higher than the normal output (step S150; Y), and the determiners 2a and 2b are receiving stop signals (step S151; N), and when the number of power converters in which an abnormality is occurring is not equal to or greater than the threshold value and determination is made that an increase is not required in the output to a level higher than the normal output (step S150; N), the determiners 2a and 2b send mode signals to the output controllers 3a and 3b giving instructions to perform control in the normal mode. The output controller 3a is previously notified by the abnormality detector 6a of the occurrence of an abnormality in the power converter 4a, and thus the output controller 3a continues the stopped state of the power converter 4a, and the output controller 3b controls the output of the power converter 4b in the normal mode (step S160).

As described above, by use of the propulsion control device 1 according to the fourth embodiment, reduction can be suppressed in the propelling force of the vehicle and control can be performed so that the load on the power converter 4 does not become excessively high when an abnormality occurs in any of the power converters 4.

Fifth Embodiment

Figure 10:
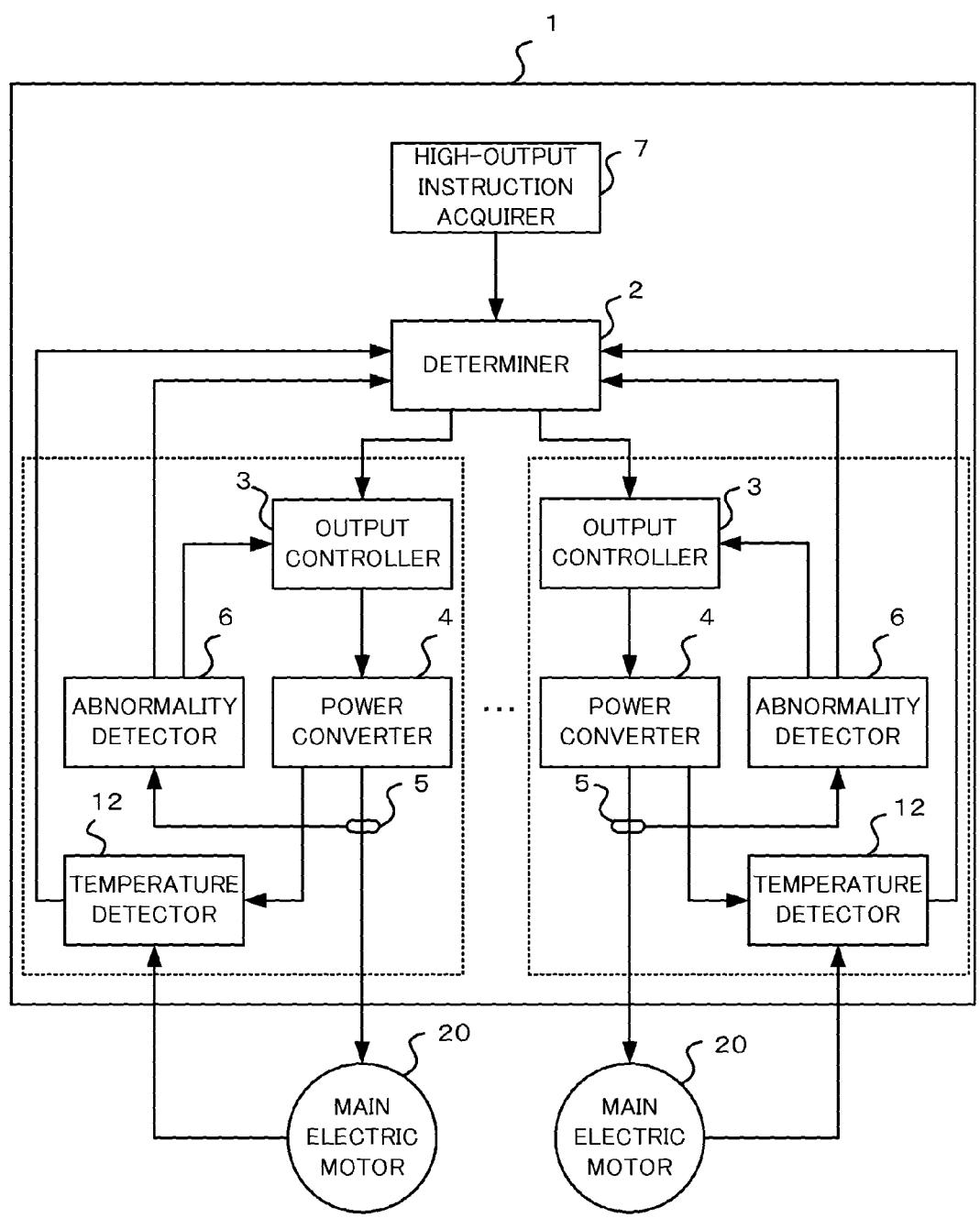
FIG. 10 is a block diagram illustrating a configuration example of a propulsion control device according to a fifth embodiment of the present disclosure.

FIG. 10 is a block diagram illustrating a configuration example of a propulsion control device according to a fifth embodiment of the present disclosure. In addition to the configuration of the propulsion control device 1 illustrated in FIG. 2, temperature detectors 12 are provided. The temperature detectors 12 can be added to the configuration of the propulsion control device 1 illustrated in FIG. 1. The operation of each part of the propulsion control device 1 that differs from that of the first embodiment is described.

A temperature detector 12 detects the temperature of at least one of a power converter 4 and a main electric motor 20 that is driven by the power converter 4, and when the detected temperature is equal to or greater than a threshold value, starts sending a stop signal to a determiner 2. Thereafter, when the detected temperature becomes less than the threshold value, the temperature detector 12 stops sending the stop signal to the determiner 2.

When a value that indicates the amount of reduction in propelling force of a vehicle satisfies a judgment criterion, the determiner 2 determines an increase is required in the output of at least one of the power converters 4 in which no abnormality is occurring to a level higher than the normal output except power converters 4 of which the temperature is equal to or greater than the threshold value or power converters 4 that drive main motors 20 of which the temperature is equal to or greater than the threshold value. When the number of power converters 4 in which an abnormality is occurring is equal to or greater than a threshold value, for example, the determiner 2 determines that an increase is required in the output of at least one of the power converters 4 in which no abnormality is occurring to a level higher than the normal output except for the power converters 4 of which the temperature is equal to or greater than the threshold value or the power converters 4 that drive main electric motors 20 of which the temperature is equal to or greater than the threshold value. The threshold value for the temperature of the power converters 4, and the threshold value for the temperature of the main electric motors 20 can be the same value or can be different values.

When an output controller 3 is notified by an abnormality detector 6 of the occurrence of an abnormality in the power converter 4, the output controller 3 stops the power converter 4. When the determiner 2 determines that an increase is required in the output of at least one of the power converters 4 in which no abnormality is occurring, except for the power converters 4 of which the temperature is equal to or greater than the threshold value or the power converters 4 that drive main electric motors 20 of which the temperature is equal to or greater than the threshold value, the output controller 3 performs control so that the output of the power converter 4 becomes higher than the normal output. By increasing the output of the power converter 4, reduction can be suppressed in the propelling force of the vehicle due to abnormality in any of the power converters 4.

Even when the number of the power converters 4 in which an abnormality is occurring is equal to or greater than a threshold value, the output controller 3 performs control so that the output of the power converter 4 in which no abnormality is occurring and of which the temperature is equal to or greater than the threshold value or the power converter 4 in which no abnormality is occurring and that drives the main electric motor 20 of which the temperature is equal to or greater than the threshold value, becomes normal output. The output of the power converter 4 in which the temperature is equal to or greater than the threshold value or the power converter 4 that drives the main electric motor 20 of which the temperature is equal to or greater than the threshold value, becomes normal output, and thus control can be performed so that the load on the power converter 4 does not become excessively high.

Figure 11:
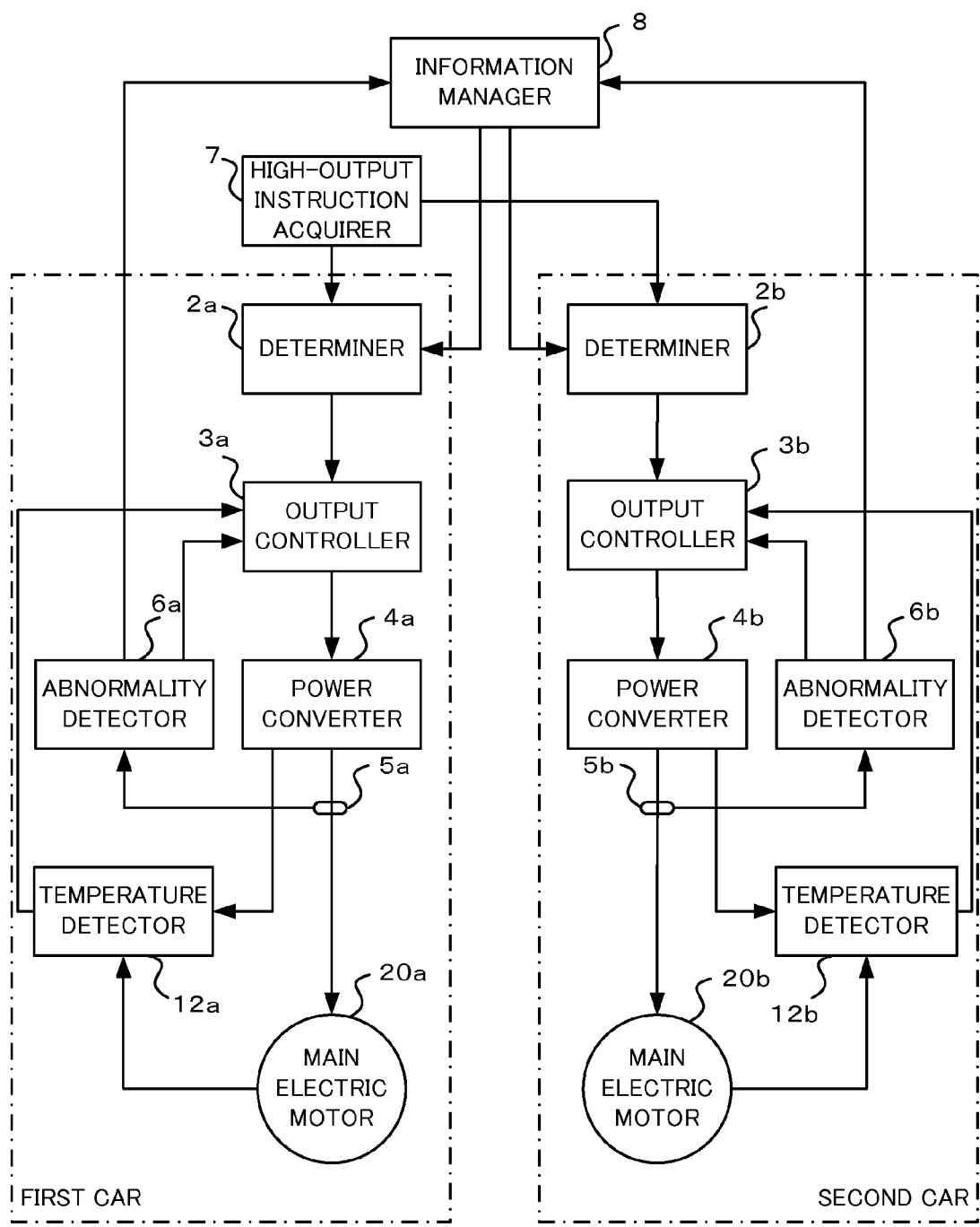
FIG. 11 is a block diagram illustrating an arrangement example of the propulsion control device according to the fifth embodiment.

FIG. 11 is a block diagram illustrating an arrangement example of the propulsion control device according to the fifth embodiment. In addition to the configuration illustrated in FIG. 3, temperature detectors 12a and 12b are respectively arranged in a first car and a second car. The temperature detector 12a detects the temperature of at least one of a power converter 4a and a main electric motor 20a that is driven by the power converter 4a, starts sending a stop signal to a determiner 2a when the temperature is equal to or greater than the threshold value, and stops sending the stop signal to the determiner 2a when the temperature becomes less than the threshold value. In the case of detecting the temperature of both the power converter 4a and the main electric motor 20a, the temperature detector 12a can start sending a stop signal to the determiner 2a when the temperature of either one is equal to or greater than the threshold value, and can stop sending the stop signal to the determiner 2a when both temperatures become less than the threshold value.

Similarly, a temperature detector 12b detects the temperature of at least one of a power converter 4b and a main electric motor 20b that is driven by the power converter 4b, starts sending a stop signal to a determiner 2b when the temperature is equal to or greater than the threshold value, and stops sending the stop signal to the determiner 2b when the temperature becomes less than the threshold value.

Operation of the propulsion control device 1 when an abnormality occurs in the power converter 4a, and a high-output instruction acquirer 7 does not acquire an instruction, is described as an example. As in the first embodiment, an abnormality detector 6a detects that an abnormality occurs in the power converter 4a based on the electric current that the power converter 4a outputs and an electric current detector 5a detects, and notifies an output controller 3a and an information manager 8 of the occurrence of an abnormality in the power converter 4a. After receiving the notification, the output controller 3 stops the power converter 4a. An abnormality detector 6b does not detect an abnormality, and thus does not notify either an output controller 3b or the information manager 8.

The information manager 8 calculates the number of the power converters in which an abnormality is occurring, among the power converters 4a and 4b, as 1, and sends the calculated number to the determiners 2a and 2b. The determiners 2a and 2b determine whether an instruction is previously acquired from the high-output instruction acquirer 7, and determine if a state exists in which the number of power converters in which an abnormality is occurring, and that is previously received from the information manager 8, is equal to or greater than the threshold value and stop signals are being sent from the temperature detectors 12a and 12b. At the start of processing, the temperature is less than the threshold value. When the threshold value for the number of power converters in which an abnormality is occurring is taken to be 1, the number of power converters in which an abnormality is occurring, and that is previously received from the information manager 8, is equal to or greater than the threshold value of 1, and thus the determiners 2a and 2b send mode signals to the output controllers 3a and 3b giving instructions to perform control in the high-output mode.

As in the first embodiment, although the output controller 3a receives a mode signal giving an instruction to perform control in the high-output mode, the output controller 3a is previously notified by the abnormality detector 6a of the occurrence of an abnormality in the power converter 4a, and thus the output controller 3a continues the stopped state of the power converter 4a. The output controller 3b receives a mode signal giving an instruction to perform control in the high-output mode, then switches from the normal mode to the high-output mode, and by controlling the output of the power converter 4b, increases the output of the power converter 4b to a level higher than the normal output. By increasing the output of the power converter 4b in which no abnormality is occurring to a level higher than the normal output even when an abnormality occurs in the power converter 4a, reduction can be suppressed in the propelling force of the vehicle.

As a result of repeatedly performing the processing described above, the power converter 4a remains stopped, and the temperature of the power converter 4b detected by the temperature detector 12b becomes equal to or greater than the threshold value. When the temperature becomes equal to or greater than the threshold value, the temperature detector 12b starts sending a stop signal to the determiner 2b. When the stop signal is sent from the temperature detector 12b, even when the number of power converters in which an abnormality is occurring, and that is previously received from the information manager 8, is equal to or greater than the threshold value, the determiner 2b sends a mode signal to the output controller 3b giving an instruction to perform control in the normal mode.

The output controller 3b receives a mode signal giving an instruction to perform control in the normal mode, and thus switches from the high-output mode to the normal mode, and controls the output of the power converter 4b so that the output of the power converter 4b returns to the normal output. Control can be performed so that the load on the power converter 4b does not become excessively high.

The temperature of the power converter 4b operating in the normal mode thereafter become less than the threshold value. When the temperature becomes less than the threshold value, the temperature detector 12b stops sending the stop signal to the determiner 2b. The determiner 2b determines whether an instruction is previously acquired from the high-output instruction acquirer 7, and determines if a state exists in which the number of power converters in which an abnormality is occurring, and that is previously received from the information manager 8, is equal to or greater than the threshold value and there is no stop signal ¥ sent from the temperature detector 12b. The number of power converters in which an abnormality is occurring, and that is previously received from the information manager 8, is equal to or greater than the threshold value of 1, and thus the determiner 2b sends a mode signal to the output controller 3b giving an instruction to perform control in the high-output mode. In this way, the power converter 4b operates again in the high-output mode.

The operation when an instruction is acquired by the high-output instruction acquirer 7 is the same as the operation in the first embodiment, and by increasing the output of the power converter 4b in which no abnormality is occurring to a level higher than the normal output when an instruction is acquired from the high-output instruction acquirer 7 even though the number of power converters in which an abnormality is occurring is not equal to or greater than the threshold value, or even though there are stop signals output from detectors 12a and 12b, reduction can be suppressed in the propelling force of the vehicle.

The operation of the propulsion control that is performed by the propulsion control device 1 according to the fifth embodiment is the same as the operation of the propulsion control that is performed by the propulsion control device 1 according to the fourth embodiment illustrated in FIG. 9.

As described above, by use of the propulsion control device 1 according to the fifth embodiment, reduction can be suppressed in the propelling force of the vehicle and control can be performed so that the load on the power converter 4 does not become excessively high when an abnormality occurs in any of the power converters 4.

The embodiments of the present disclosure are not limited to the embodiment described above, and other embodiments can be configured as any combination of more than one of the embodiments above. For example, by combining the first to third embodiments, the determiner 2 can be configured so as to determine that an increase is required in the output of the power converter 4 in which no abnormality is occurring, among the total power converters 4, to a level higher than the normal output when the number of power converters 4 in which an abnormality is occurring, among the total power converters 4, is equal to or greater than the threshold value, or when the acceleration of the vehicles is equal to or less than the threshold value, and to change the judgment criterion according to the incline at the location where the vehicle is traveling. Moreover, by combining the fourth and fifth embodiments, for example, the determiner 2 can be configured so as to determine that an increase is required in at least one of the output of the power converters 4 in which no abnormality is occurring to a level higher than the normal output when the value that indicates the amount of reduction in propelling force of the vehicle satisfies the judgment criterion, and when there is no stop signal output from either the timer 11 or the temperature detector 12.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full scope of equivalents to which such claims are entitled.

INDUSTRIAL APPLICABILITY

The technology of the present disclosure can be suitably applied to a propulsion control device of an electric vehicle.

REFERENCE SIGNS LIST

1 Propulsion control device
2, 2a, 2b Determiner
3, 3a, 3b Output controller
4, 4a, 4b Power converter
5, 5a, 5b Electric current detector
6, 6a, 6b Abnormality detector
7 High-output instruction acquirer
8 Information manager
9 Weight detector
10a, 10b Load detector
11, 11a, 11b Timer
12, 12a, 12b Temperature detector
20, 20a, 20b Main electric motor

The invention claimed is:

1. A propulsion control device, comprising:
a plurality of power converters to output power to drive main electric motors for driving wheels;
an output controller to control the output of a power converter of the plurality of power converters;
an abnormality detector to detect whether an abnormality is occurring in the power converter; and
a determiner to determine, when a value that is based on a number of power converters in which an abnormality is occurring, among the plurality of power converters, and that indicates amount of reduction in propelling force of a vehicle, satisfies a judgment criterion, that an increase is required in the output of at least one of the power converters in which no abnormality is occurring, among the plurality of power converters, to a level higher than a normal output that is an output when no abnormality is occurring in any of the plurality of power converters; wherein
the output controller performs control so that the output of the power converter, for which the determiner determines that the increase is required in the output to the level higher than the normal output, becomes higher than the normal output.

2. The propulsion control device according to claim 1, wherein
when the number of power converters in which an abnormality is occurring is equal to or greater than a threshold value,
the determiner determines that the increase is required in the output of the at least one of the power converters in which no abnormality is occurring to the level higher than the normal output.

3. The propulsion control device according to claim 1, further comprising
a weight detector to detect a weight of the vehicle; wherein
the determiner uses an acceleration of the vehicle that is calculated, based on the number of power converters in which the abnormality is occurring, a maximum value of outputs of the plurality of power converters, a total number of the plurality of power converters and the weight of the vehicle, as the value that indicates the amount of reduction in the propelling force of the vehicle, and when the acceleration of the vehicle is equal to or less than a threshold value, determines that the increase is required in the output of the at least one of the power converters in which no abnormality is occurring to the level higher than the normal output.

4. The propulsion control device according to claim 1, wherein
the determiner acquires information about an incline at a location where the vehicle is traveling, and changes the judgment criterion based on the incline at the location where the vehicle is traveling.

5. The propulsion control device according to claim 1, further comprising
a timer to measure an operating time of the power converter in an output state that is higher than the normal output, and based on the operating time, determine whether operation is possible of the power converter in the output state that is higher than the normal output; wherein
when the value that indicates the amount of reduction in the propelling force of the vehicle satisfies the judgment criterion,
the determiner determines that the increase is required in the output of the at least one of the power converters in which no abnormality is occurring and for which the timer determines that operation is possible in the output state that is higher than the normal output to the level higher than the normal output.

6. The propulsion control device according to claim 1, further comprising
a temperature detector to detect at least one of a temperature of the power converter and a temperature of the main electric motor to which the power converter outputs power; wherein
when the value that indicates the amount of reduction in the propelling force of the vehicle satisfies the judgment criterion,
the determiner determines that the increase is required in the output of the at least one of the power converters in which no abnormality is occurring, except for the power converter of which the temperature is equal to or greater than a threshold value, or the power converter that outputs power to the main electric motor of which the temperature is equal to or greater than a threshold value, to the level higher than the normal output.

7. The propulsion control device according to claim 1, further comprising
a high-output instruction acquirer to acquire an instruction for increasing the output of the power converter; wherein
when the high-output instruction acquirer acquires an instruction, or when the value that indicates the amount of reduction in the propelling force of the vehicle satisfies the judgment criterion,
the determiner determines that the increase is required in the output of the at least one of the power converters in which no abnormality is occurring to the level higher than the normal output.

8. The propulsion control device according to claim 1, further comprising:
an information controller to calculate the number of power converters in which the abnormality is occurring, among the plurality of power converters, based on information indicating whether the abnormality is occurring in the power converter, wherein
the determiner performs the determination using the value that is based on the number of power converters in which the abnormality is occurring, and that indicates the amount of reduction in the propelling force of the vehicle, the number of power converters being calculated by the information controller.

9. A propulsion control method performed by a propulsion control device comprising a plurality of power converters to output power to drive main electric motors for driving wheels, comprising:
detecting whether an abnormality is occurring in a power converter of the plurality of power converters; and
determining, when a value that is based on a number of power converters in which an abnormality is occurring, among the plurality of power converters, and that indicates amount of reduction in propelling force of a vehicle, satisfies a judgment criterion of, that an increase is required in the output of at least one of the power converter in which no abnormality is occurring, among the plurality of power converters, to a level higher than a normal output that is an output when no abnormality is occurring in any of the plurality of power converters; and performing control so that the output of the power converter, for which the increase is determined to be required in the output to the level higher than the normal output, becomes higher than the normal output.

* * * * *